June 13, 1967

N. LAING 3,324,939

CENTRAL HEATING SYSTEMS

Filed March 2, 1964

June 13, 1967 N. LAING 3,324,939
CENTRAL HEATING SYSTEMS
Filed March 2, 1964 8 Sheets-Sheet 3

United States Patent Office 3,324,939
Patented June 13, 1967

3,324,939
CENTRAL HEATING SYSTEMS
Nikolaus Laing, Aldingen, near Stuttgart, Germany, assignor, by mesne assignments, to Laing Vortex, Inc., New York, N.Y.
Filed Mar. 2, 1964, Ser. No. 348,537
Claims priority, application Germany, Jan. 13, 1959, E 17,001
9 Claims. (Cl. 165—122)

This invention relates to central heating/air conditioning systems and space-heating room units therefor.

The application is a continuation-in-part of my copending application Ser. No. 1,922, filed Jan. 12, 1960, now abandoned.

The commonest form of central heating system, at least in the past, has comprised a series of so-called "radiators" arranged in the rooms to be heated and supplied with hot water by means of flow and return pipes connected to a boiler, the "radiators" being connected in parallel across the flow and return pipes and controlled by a cock. It has been appreciated that such "radiators" are relatively inefficient and slow to heat up a room because air is moved past the heat exchanging surfaces solely by convection, and therefore slowly and with inefficient heat transfer, and heated air travels towards the ceiling where it is least effective to provide warmth and comfort to people in the room. Proposals have therefore been made to combine the "radiators," in the system just described, with fans which drive air past the heat exchanging surfaces and which can have their outlet directed out into the room. However these proposals have commonly led to apparatus which is of complicated construction and involves complex control arrangements.

A main object of the invention is to provide a central heating/air conditioning system, and space-heating units therefor which are relatively simple to control and which enable economies to be obtained in construction and installation costs.

The invention in its broadest aspect provides a space-heating room unit comprising a casing having a closed heat-insulated upper part and a lower part providing an inlet and an outlet; a heat exchanger for transfer of heat between a fluid circulating in the heat exchanger and air flowing over it, the heat exchanger being located in the closed upper part of the casing; and a blower mounted within the casing to convey air into the inlet, along paths of inverted U-shape within the casing, and out of the outlet, said paths traversing the heat exchanger; the casing substantially preventing flow of heat from the heat exchanger to the exterior of the casing except on operation of the blower by reason of heat transfer to the outflowing air.

The room unit just mentioned can in its simplest form be controlled solely by controlling the blower, and requires no cock in the fluid circulation system. Thus, if no heat is required from the room unit the blower is stopped: since the air inlet and outlet are below the heat exchanger no convection can occur. The upper part of the casing is preferably insulated to avoid heat losses by conduction but in general the stagnant air inside the casing will provide sufficient insulation to the heat exchanger to avoid any substantial heat loss by conduction. The amount of heat discharged into the room can be controlled by variation of the rate of flow from the outlet, which may be achieved by varying the r.p.m. of the blower.

An important advantage of the room unit mentioned above is that the heat exchangers of different room units may be connected in series in a single pipe line through which fluid is continuously circulated from a central source: a central heating system on these lines requires less piping and valves than a comparable conventional system and so reduces both the cost of material and also the labour charges involved in installing the system in a building.

Although the invention contemplates that the blower of the room unit above specified may be electrically driven, it is a preferred feature of the invention that the blower is driven by a turbine through which the circulating fluid is passed. This avoids the need for electrical connections to the various units, and enables speed control of the blower over a wider range than is ordinarily available with electric motor drive. The basic control requirement for each room unit then becomes simply the speed control of the turbine, which may be effected manually or by thermostat; a combination of manual and thermostat control of the turbine speed can conveniently be provided.

The invention provides, according to further preferred features, a compact arrangement of the room unit defined above wherein the casing has a generally rectangular horizontal cross section and the outlet has the form of a slit extending parallel to the long sides of the rectangle over at least a major part of the length of the housing, the blower has a bladed cylindrical rotor mounted for rotation about a horizontal axis parallel to said long sides and guide means cooperating with the rotor on rotation thereof to induce a flow of air twice through the path of the rotating blades of the rotor, and the blower rotor, heat exchanger and outlet slit extend substantially opposite one another so that the main air flow takes place substantially along planes which are parallel to the short sides of the rectangle. This arrangement enables substantially ideal utilization of a large-area rectangular heat exchanger, since relatively good uniformity of air flow through it can be obtained. Also, the heated air can be discharged from the slit along the floor in a wide jet of good carrying power, such as to provide effective heating of the room.

According to a subsidiary feature of the invention, the heat exchanger may have upper and lower headers and the upper header can be provided with a refrigerator condenser unit, so that in summer the room unit can be used for providing a cold air flow.

A further subsidiary feature of the invention resides in the provision of means to recirculate air through the heat exchanger so as to increase its temperature, at the expense of throughput. The rotor and guide means above mentioned have been found effective to convey large volumes of air at comparatively low pressure but the pressure available limits the resistance of the heat exchanger and thereby the temperature rise which can be imparted to air during a single passage through it. By recirculating a proportion of the throughput the air may have its temperature increased in stages, the number of stages and hence the resultant temperature depending on the proportion recirculated.

The invention will be described further with reference to the accompanying drawings, in which.

Figure 1:
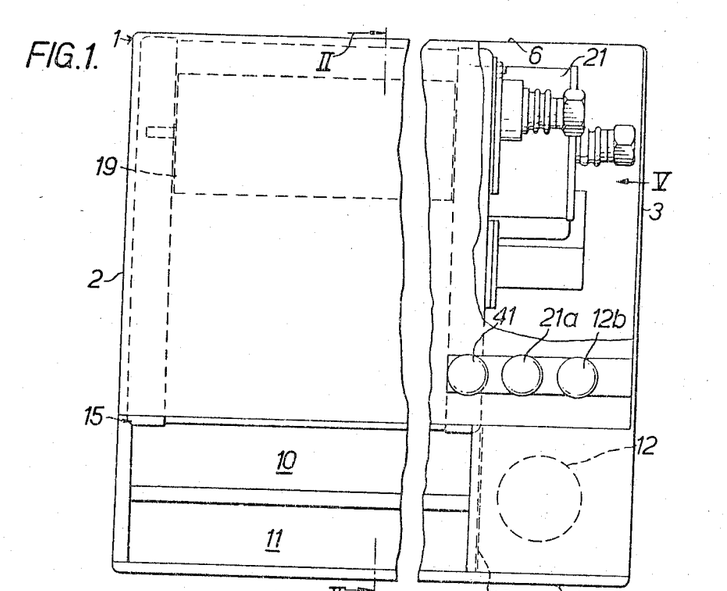
FIGURE 1 is a front view of a space-heating room unit with a part broken away and a portion of the front removed to show interior parts.
Figure 2:
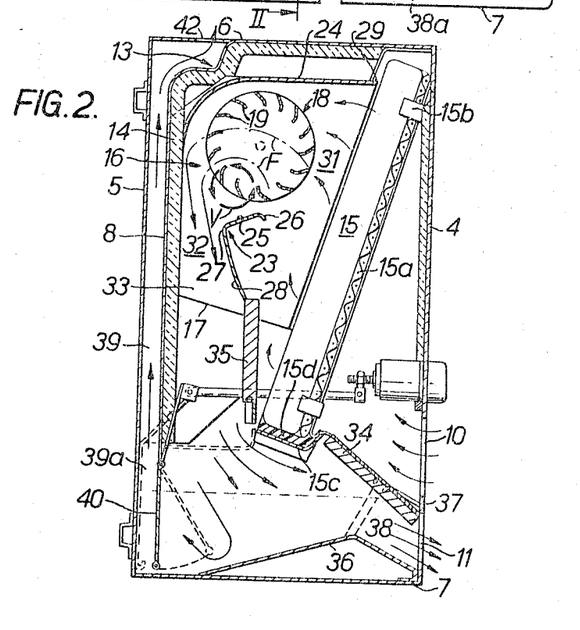
FIGURE 2 is a vertical section of the FIGURE 1 unit, taken on the line I—I shown therein.

Referring first to FIGURES 1 and 2 of the drawings, the space-heating room unit there shown comprises a casing designated generally 1 and having vertical end walls 2, 3, vertical front and rear walls 4, 5 (the rear wall being placed against a wall of the room and the front wall facing outwardly therefrom), a flat top 6 and a bottom 7; the horizontal cross section of the casing 1 has the form of a rectangle whose long sides, formed by the front and rear walls 4, 5, are several times longer than its short sides, formed by the end walls 2, 3. An interior wall 8 extends parallel to the rear wall 5 from the top 6 of the casing 1 down to near the bottom. An air inlet 10 and an air outlet 11 are provided in the form of rectangular slots extending substantially the width of the casing 1 one above the other at the lower part of the front wall 4. An auxiliary air inlet 12, in the form of a circular aperture, is provided in the lower part of the rear wall 5 near the end wall 3; this auxiliary inlet 12 is controlled by a valve 12a connected to an operating knob 12b on the front wall of the casing and adapted to be connected by a duct to the exterior of the room in which the space-heating unit is situated. The portion of the front wall 4 above the air outlet 10, the interior wall 8, and the portion of the top 6 between the front and interior walls, define with the end walls 2, 3 a closed upper part of the casing, designated generally 13, which is heat-insulated by lagging 14 applied to the interior surfaces of these wall portions.

A heat exchanger 15 of rectangular shape, which will be described later in more detail, and through which hot fluid circulates continuously, is mounted within the closed upper part 13 of the casing 1. The heat exchanger 15 extends from adjacent the casing end wall 2 over the major part of the width of the casing; as will be seen, the heat exchanger is co-extensive with and opposite to the inlet 10 and outlet 11, and all three items terminate short of the end wall 3. Considered in vertical section as seen in FIGURE 2 the heat exchanger extends diagonally inwardly and downwardly from the front top edge of the casing and terminates about midway between the lower edge of the interior wall 8 and the top edge of the air inlet 10. A filter 15a extends over the whole upstream area of the heat-exchanger, and is supported from the heat exchanger with the aid of brackets 15b. The heat exchanger 15 forms a major structural element of the space heating unit, as will be seen below; it is supported in the casing 1 upon a transversely extending bar 15c therein, through the intermediary of padding 15d.

Figure 4:
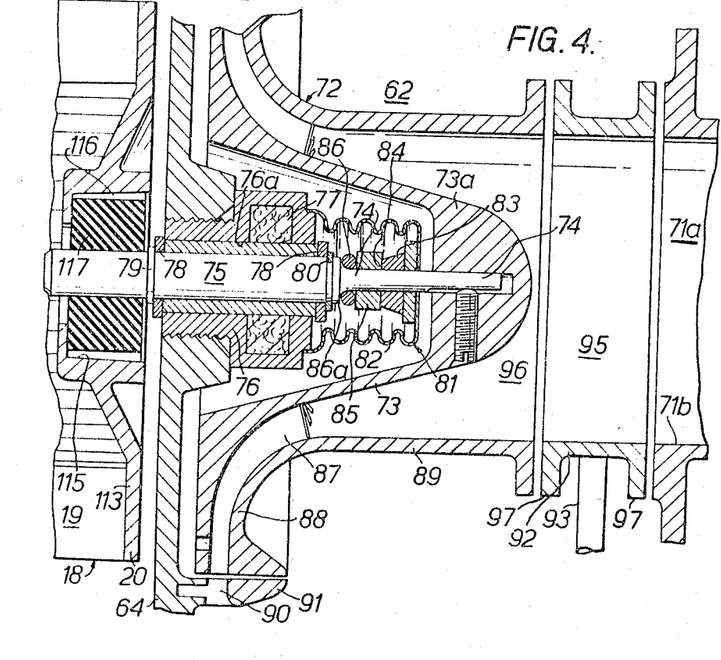
FIGURE 4 is an enlarged longitudinal section of a part of the fan drive unit shown in FIGURE 3, and illustrating its connection to the fan rotor.

A fan unit 16 is also mounted within the closed upper part 13 of the casing 1, near the top 6 thereof and rearward of the heat exchanger 15. The fan unit 16 has parallel end walls 17 which are aligned with the short sides of the rectangle defined by the heat exchanger 15; these end walls extend between the upper part of the heat exchanger and the lagging 13 on the interior wall 8. The end walls 17 of the fan unit rotatably mount (in a manner described in more detail later) a bladed cylindrical rotor 18 extending between them and consisting of a series of forwardly curved blades 19 supported between end members 20 (one of which is seen in FIGURE 4) so as to lie parallel to the rotor axis and in a ring thereabout. A drive unit 21 controlled by a knob 21a on the front wall of the casing is mounted between the casing end wall 3 and the adjacent fan unit end wall 17 and is directly coupled to the rotor to drive it in the direction indicated by the arrow 22: the drive unit and control therefor will also be more fully described below. Lower and upper guide walls 23, 24 extend between the end walls 17 below and above the rotor respectively. The lower guide wall 23 provides a main guide portion 25 subtending a small arc at the rotor axis (some 15°) and converging with the rotor 18 in the direction of rotation towards a line 26 of nearest approach spaced from the rotor by somewhat over half the radial blade depth: remote from the rotor 18 the main guide portion 25 merges in a rounded nose 27 with an outlet guide portion 28, the two guide portions defining between them an angle of some 90°. The upper guide wall 24 has its front edge 29 close to the upper rear edge of the heat exchanger 15; the wall extends horizontally rearwardly from its edge 29 and rearwardly of the rotor fairs into the interior surface of the lagging 14 covering the interior wall 8; at its nearest approach to the rotor 18, which is about diametrically opposite the line 26 of nearest approach of the lower guide wall 23, the upper guide wall 24 is also spaced from the rotor by somewhat over half the radial blade depth. The front wall 4, upper guide wall 24, interior wall 8 together with guide portion 28 and guide 35 form an inverted U-shaped passageway positioned in the direction of air flow between the inlet 10 and the outlet 11 such that a flow path of inverted U-shape is provided in the closed upper part. As so far described, the fan unit operates as follows. Rotation of the rotor 18 by the drive unit 21 in the direction of the arrow 22 sets up a vortex of Rankine type by reason of the interaction of the rotor and the guide walls 23, 24; the core of the vortex, indicated diagrammatically at V, is eccentric of the rotor axis and more or less adjacent the main portion 25 of the lower guide wall 23. By reason of the vortex air is guided to pass from the inlet side of the rotor 18 shown at 31, through the path of the rotating blades 19 to the interior of the rotor and thence again through the path of the rotating blades to the outlet side of the rotor, indicated at 32. The air flow takes place in planes which are generally transverse to the rotor axis and along paths, indicated schematically by the flow lines F, which are strongly curved about the vortex core V, the fastest flow being that immediately adjacent the core. As a consequence air is discharged more or less vertically downwards from the rotor 18 through the diffuser 33 formed between the interior surface of the lagging 14 on the intermediate wall 8 and the outlet guide portion 28 of the lower guide wall 23.

Additional plate-like flow guides 34, 35, 36 are mounted within the casing; the guide 34 extends between the strip 37 of the front wall 4 separating the inlet 10 and outlet 11, and the lower forward edge of the heat exchanger 15, while the guide 35 forms a continuation of the outlet guide portion 28 of the lower fan unit guide wall 23 and terminates at the lower rearward edge of the heat exchanger 15. The guide 36 forms an upward protrusion on the casing bottom 7 and defines with the lower surface of the guide 34 a downwardly directed converging nozzle 38 through which air passes to the outlet 11. A bulkhead 38a confines air flow (apart from any flow from the auxiliary inlet 12) to that part of the casing 1 which contains the heat exchanger 15, fan unit 16, main inlet 10 and outlet 11. Further partition walling (not shown) prevents flow from the auxiliary air inlet 12 to the inlet side of the heat exchanger 15.

The rear and interior casing walls 5, 8 define a narrow duct 39 which communicates at 39a with the air space within the lower part of the casing 1 under the control of a flap valve 40 which is movable by means of an operating knob 41 on the front wall 4 of the casing. In FIGURE 2 the valve 40 is shown in closed position in full lines and in open position in chain-dotted lines. In the latter position warm air from within the casing travels up the duct 39 and leaves by a slit 42 in the top of the casing.

As so far described the space heating room unit operates as follows. As explained, hot liquid circulates continuously in the heat exchanger 15. However if the fan drive unit 16 is not operating to drive the fan rotor 18, substantially no heat will escape from the casing; this is because the heat exchanger is situated in a closed upper part 13 of the casing—thus convection cannot take place past the heat exchanger since both the inlet 10 and outlet 11 (as well as the auxiliary inlet 12 and the communication 39a to the duct 39, if these are open) lie at a lower level, while the stagnant air in the upper casing part aided by the lagging 14 therein effectively prevent any major heat loss by conduction.

When the control knob 21a is set for operation of the fan drive unit 21, air is drawn by the fan unit 16 from the room through the inlet 10, and passed through the filter 15a and then through the heat exchanger 15 over the whole area thereof. The heated air then flows through the fan rotor 18 where its general direction is changed by something over 90°, and through the diffuser 33 where some of its velocity energy is converted to pressure energy. Finally the air passes through the converging outlet nozzle 38 and leaves the outlet 11 in the form of a flat jet which is directed forwardly and slightly downwardly over the floor of the room. By reason of its shape and direction, as well as by the guidance provided by the floor, the jet leaving the outlet 11 will penetrate well into the room, and will have no tendency to recirculate directly back into the inlet 10. By providing the heated air over the floor, as opposed simply to letting it rise directly to the ceiling as with the conventional radiator system, the room may quickly be heated to a desired temperature and readily maintained thereat without setting up excessive and disturbing temperature gradients between floor and ceiling; it will moreover be appreciated that the warmth at floor level promotes the comfort of the occupants of the room, and may enable a required degree of physical comfort to be obtained with lower temperatures than common heretofore. It is to be appreciated that the air flow between inlet 10 and outlet 11 takes place in planes transverse to the axis of the fan rotor and generally parallel to the casing end walls 2, 3. The major change in flow direction within the casing occurs in the rotor 18 where by reason of the vortex it is accomplished without the energy losses associated with bends in ducting. The unit described thus provides the flat jet just mentioned with a minimum of energy loss due to changes of flow direction in ducting, so that the size and running speed of the fan unit need not be excessive.

A desired proportion of fresh air from outside the building may be introduced by opening the auxiliary air inlet 12 by means of the control knob 12b. Air from this inlet 12 then mixes on the upstream side of the heat exchanger with the air drawn in from the room through the main inlet 10. A proportion of the heated air can be delivered through the duct 39 to the outlet slit 42 in the top 6 of the casing: this will be particularly desirable where the unit stands under a window, to avoid cold downdraughts therefrom.

Figure 6:
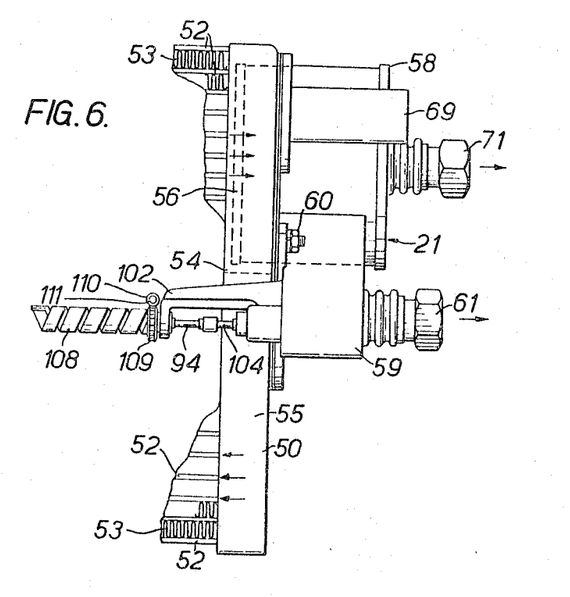
FIGURE 6 is a front elevational view of the fan drive unit, the adjacent part of the heat exchanger and the connections therebetween, showing a broken away portion of the heat exchanger in diagrammatic section, and showing also thermostat control means for the drive unit.

The heat exchanger 15 (see particularly FIGURE 6) comprises end header members 50, 51 between which extend horizontally a series of flat tubes 52; the space between adjacent tubes is filled with deeply corrugated thin sheet metal strips 53 which are soldered to the tubes and extend the heat-exchanging area thereof. As the heat-exchanger 15 is seen in FIGURE 6 the air flow therethrough takes place perpendicularly to the plane of the paper. The header member 50 is subdivided midway in its height by a wall 54 to provide inlet and outlet chambers 55, 56, communicating respectively with the lower and the upper tubes 52. The header member 51 is undivided and communicates with all the tubes 52. Hot water is introduced into the inlet chamber 55 of the header member 50, flows through the lower tubes 52 to the header member 51 and thence flows through the upper tubes 52 back to the outlet chamber 56.

The fan drive unit 21 (best seen in FIGURES 3 to 6) comprises a cylindrical casing 58 having its axis horizontal and having a lateral extension 59 bolted as shown at 60 on to the end header member 50 which thereby provides support for the unit. The casing extension 59 carries an inlet pipe connection 61 leading to the inlet chamber 55 in the header member 50 but not communicating with the interior of the extension. The casing 58 and its extension 59 provide respectively a turbine chamber 62 and a side chamber 63 leading out of it. The casing 58 is formed by a vertical base plate 64, in general front-to-rear alignment with the end header member 50, an opposed circular end plate 65, and a cylindrical side wall 66 received in grooves 67 in the base plate and end plate and clamped between them by bolts 68. The outlet chamber 56 of the end header member 50 is connected to the turbine chamber 62 by a duct 69 leading thereinto at an inlet opening 70 formed in the casing end plate 65 adjacent the side wall 66. The casing end plate 65 also provides an axial outlet pipe connection 71 leading from an outlet chamber 71a formed in the depth of the end plate and presenting to the turbine chamber 62 a wide axial opening 71b.

Figure 3:
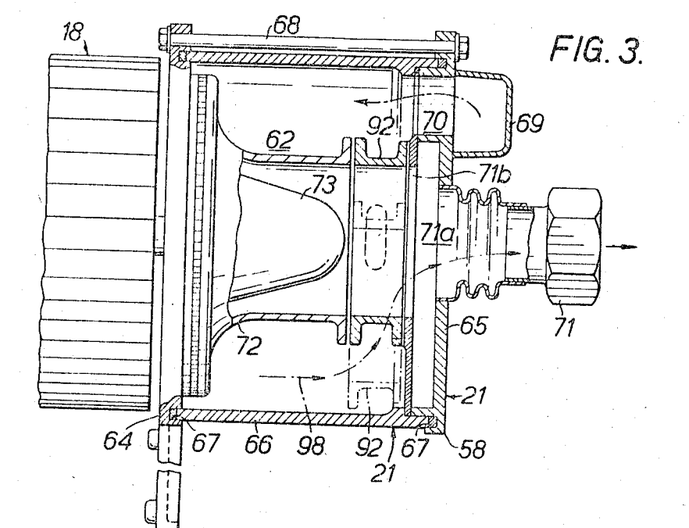
FIGURE 3 is a longitudinal sectional view of a fan drive unit forming part of the apparatus of FIGURES 1 and 2.

A turbine rotor 72 is mounted within the turbine chamber 62 for rotation about the axis of the casing 58. The rotor 72 has a hollow generally conical hub 73 projecting into the chamber 62 and supported by its closed inner end 73a on the reduced end portion 74 of a shaft 75 journalled on a bearing 76 mounted on the base plate 64 of the casing. The bearing 76 has a sleeve 76a of sinter type which surrounds the shaft and which is itself surrounded by an annular lubricant stove 77. The shaft 75 is located axially by washers 78 at either end of the bearing 76, the washer outside the chamber 62 abutting a shoulder 79 on the shaft and the washer at the other end of the bearing being held in place by a circlip 80. Liquid is prevented from leaving the chamber 62 about the shaft 75 by means designated generally 81 which forms a seal between the shaft and its bearing 76. This sealing means comprises a bellows 82 surrounding the reduced end portion 74 of the shaft 75 and having one end secured to the end of the bearing 76 within the chamber 62 and the other mounting a carbon ring 83 with a sealing face 84 directed towards the bearing and forming a rotating seal with a metal collar 85 freely mounted on the shaft end portion. An O-ring 86 is compressed between the collar 84 and a shoulder 86a on the shaft 75, so as to form a seal between the shaft and the collar. The O-ring 86 and bellows 82 together provide endwise pressure at the sealing face 84. As will be seen, most of the length of the bearing 76 as well as the sealing means 81, are accommodated within the hollow hub 73 of the rotor 72. Surrounding the hub 73 and adjacent the casing base plate 64 the turbine rotor 72 carries a ring of blades 87 designed for inward-flow and a shroud ring 88 for such blades which flares into a cylindrical wall 89. The base plate 64 mounts a ring of fixed blades 90 surrounding the rotor 72 and aligned with the rotor blades 87, and a fixed shroud ring 91. A control ring 92 is supported within the turbine chamber 62 by means of a rod 93 extending through the side chamber 63 and mounted at the extreme end thereof (as will later be described) for angular movement upon a pivot shaft 94. The control ring 92 may be positioned, as shown in FIGURES 3 and 4 in full lines where it lies aligned on the common axis of the turbine chamber 62 of rotor 72 therein. In this position the ring 92 provides in effect a stationary continuation 95 of the outlet duct 96 formed by the rotating cylindrical wall 89 of the rotor 72 and leads water which has passed through the blade rings 87, 90 to the aligned opening 71b of the outlet chamber 71a; for easy flow the ducts 95, 96 are given the same internal diameter as that of the opening 71b, and to minimize leakage from the inlet opening 70 direct to the outlet chamber 71a and by-passing the turbine rotor 72, the ends of the ring 92 are outwardly flanged at 97 as is also the adjacent end of the cylindrical wall 89. The control ring 92 may also take up the position shown chain-dotted in FIGURE 3, where it lies to one side of the turbine chamber 62. With the ring 62 in this position water flows directly from the chamber 62 through the ring 92 to the outlet chamber 71a along a path shown generally by the arrows 98, thus, by-passing the blade rings 87, 90 which provide a greater resistance to flow than the path 98. In intermediate positions of the control ring 92, a proportion of the flow passes through the rotor blades 87, 90, and the rest passes direct to the outlet chamber 71a.

Figure 7:
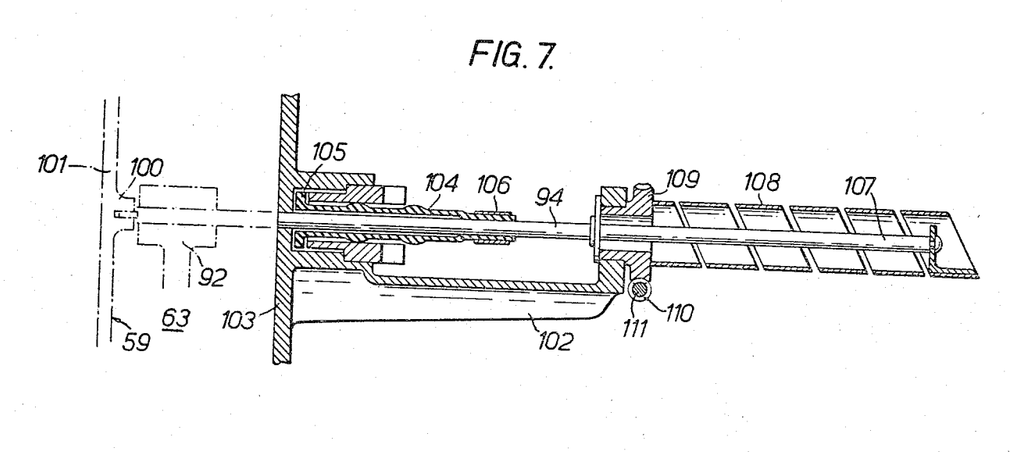
FIGURE 7 is an enlarged longitudinal sectional view of the thermostat control means shown in FIGURE 6.

Referring now to FIGURES 6 and 7, the rod 93 supporting the control ring 92 is fixed to its pivot shaft 94, and this latter is journalled at one end in a boss 100 formed on the inside of a wall portion 101 of the casing extension 59 and about midway in its length upon a bracket 102 projecting axially from the opposite wall portion 103 of the casing extension: the shaft 94 is sealed to the casing wall portion 103 where it passes therethrough with the aid of a long rubber sleeve 104 surrounding the shaft and having one end 105 clamped in sealing engagement with the wall portion 103 and the other end 106 clamped sealingly about the shaft, so that the sleeve twists as the shaft 94 moves angularly, but without imposing much torque thereon. The end 107 of the shaft 94 remote from the casing extension 59 is fastened to one end of a bimetallic strip 108 coiled helically about the shaft in spaced relation thereto and having its other end secured to a worm wheel 109 journalled in the bracket 102. The worm wheel 109 co-operates with a worm 110 upon a spindle 111 which carries the fan drive unit control knob 21a. The bimetallic strip 108 extends within the air inlet 10, and in the path of air going to the heat exchanger 15.

The end members 20 of the fan rotor are dished towards the interior of the rotor as shown at 113 and are each formed with a boss 114 defining a recess 115 with internally directed ribs 116. A soft rubber bushing 117 is located in the recess 115 of the adjacent fan rotor end member 20 and compressed against the ribs 116 by the shaft 75 which extends through it. An end support (not shown) extends from the heat exchanger end header member 51 and journals a corresponding shaft (not shown) for the other end member 20 of the fan rotor.

It will be remembered from the foregoing that although hot water is circulated continuously through the heat exchanger 15 negligible heat escapes from the unit unless the fan unit 16 is operating to draw air from the inlet, past it through the heat exchanger 15 and expel the heated air in a downwardly directed flat jet from the outlet 11. The amount of heat discharged from the unit depends upon the r.p.m. of the fan rotor.

Now the water which circulates through the heat exchanger 15 is led into the inlet connection 61 and after traversing the heat exchanger is led to the series connected turbine chamber 62 before leaving the room unit through the outlet connection 71. The speed at which this continuous flow of water drives the turbine rotor 72, and hence the fan rotor 18, depends on the position of the control ring 92 which can be moved as explained to direct any desired proportion of the water flow through the turbine rotor 72 and thereby control its speed of rotation from zero to a maximum. The position of the control ring 92 in turn depends on the setting of the spindle 94 upon which it is mounted for angular movement: this position depends upon the temperature of ambient air, which determines the angular relationship between the two ends of the bimetallic strip 108, and upon the setting of the control knob 21a, which determines the angular position of the worm wheel 109 on which one of said ends is anchored. The bimetallic strip 108 moves the control ring 92 to reduce the speed of the turbine rotor 72 as the ambient temperature rises. The knob 21a acts to predetermine a desired room temperature and the bimetallic strip acts as a thermostat to obtain and maintain that temperature. By setting the knob 21a for a sufficiently low temperature, so that the control ring 92 bypasses all flow, the unit can, in effect, be switched off.

By having the fan drive unit 21 in the form of a water turbine, the speed of the fan rotor 18, and hence the heat output of the unit, can be adjusted over a much wider range than would be possible with an electric motor, unless the motor were of special type, and consequently expensive. Thus normal shaded-pole induction motors cannot be run below about half their maximum speed, while the water turbine described can be run at very low r.p.m. Another advantage of using a water turbine to drive the fan rotor is that no electrical connections have to be made on installation of the system. As will be seen, all that is required is to connect the inlet and outlet pipe connections 61, 71 in a pipe line, which can be small bore copper tubing.

However, as will be seen from description of further figures it may sometimes be desirable to use an electric motor to drive the fan.

Whatever means of driving the fan rotor 18 is employed, it will be seen that the regulation of the rotor speed is the only adjustment necessary to control the heat output. Though additional control means are provided in the embodiment just described these can if desired be dispensed with, as in further embodiments to be described later.

Figure 5:
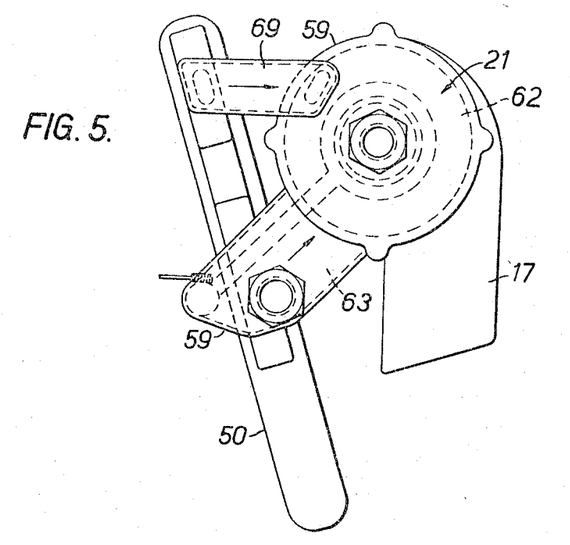
FIGURE 5 is an end elevational view, seen in the direction of the arrow V in FIGURE 1, of the fan drive unit at the heat exchanger, and showing the connections between them.

Turning now to the question of manufacture, it is to be appreciated that the room unit shown in FIGURES 1 to 7, consists essentially of two sub-units, the casing 1 on the one hand and, on the other hand, the heat exchanger 15 together with fan unit 16 and its drive unit 21. It has been explained that the heat exchanger 15 and drive unit 21 are interconnected: as illustrated in FIGURE 5, the base plate 64 of the drive unit may be formed integrally with one end wall 17 of the fan unit 16 and a corresponding construction (not shown) may be employed at the other end of the unit where the rotor bearing support means previously mentioned and carried on the heat exchanger header member 51 may be extended to provide the other end wall 17. The guide walls 23, 24 may be of sheet metal and on assembly rigidify the structure. In manufacture, the latter sub-unit, including the fan rotor 18, is fully assembled and the casing 1 is assembled separately except for the bottom 7, the flow guides 34, 35, 36 and the transverse support member 15c. The sub-unit just mentioned is then inserted through the open bottom of the casing and the remaining parts assembled therewith.

Figure 7A:
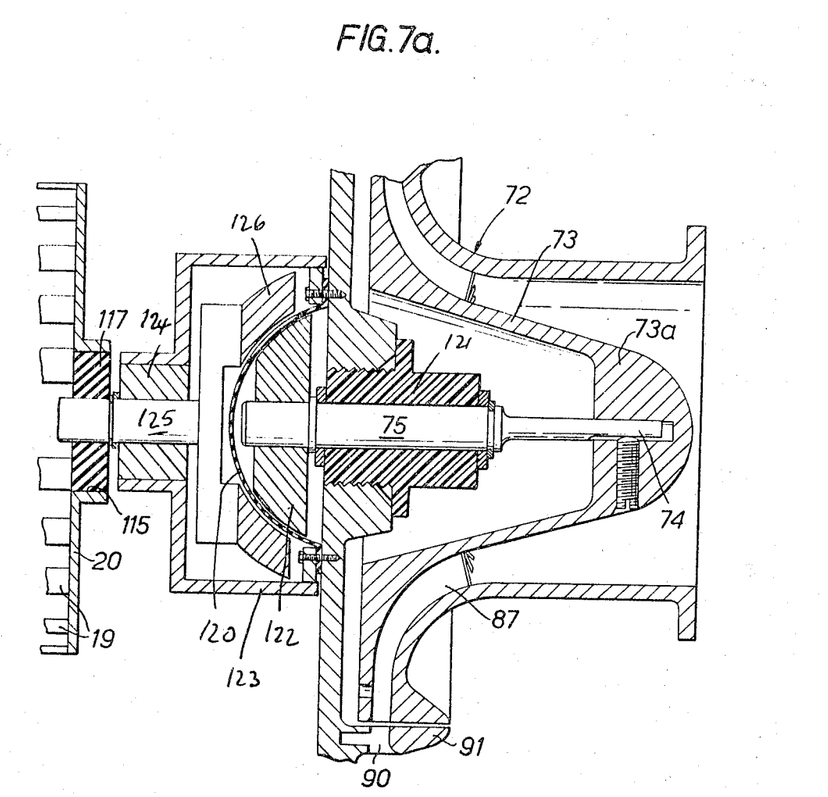
FIGURE 7a is a view corresponding to FIGURE 4 but showing a modified form of connection between the drive unit and the fan rotor.

FIGURE 7a illustrates a modification of the drive connection between the fan drive unit 21 and the fan rotor 18 as illustrated in FIGURE 4. Many of the parts illustrated in FIGURE 7a are similar to those of FIGURE 4; these parts will be given the same numerals and will need no further description. In the FIGURE 7a construction, there is clamped to the base plate 64 of the drive unit, on the side facing the rotor 18, a hemi-spherical closure 120 of thin non-magnetic material, and the bearing 76 and sealing means 81 for the turbine rotor supporting shaft 75 are replaced by a water-lubricated bearing 121, e.g. of plastics material. Within the closure 120 the shaft 75 supports a transversely disposed magnet 122. Outside the closure 120 an extension 123 of the base plate 64 mounts a bearing 124 which journals a shaft 125 axially aligned with the shaft 75 and mounting the rotor 18 in the same manner as the shaft 75 in the FIGURE 4 arrangement. On the side of the bearing 124 facing the closure 120, the shaft 125 carries an armature 126 of magnetic material embracing the closure and cooperating with the magnet 122 within it: the gaps between the magnet 122 and its armature 126 are made as small as possible and the surrounding parts are made of non-magnetic material insofar as necessary to avoid interfering with the magnetic coupling of the magnet and its armature. As will be understood, drive is transmitted from the turbine rotor 73 to the fan rotor 18 through the magnet 122 and armature 126, thus avoiding the need for shaft sealing.

FIGURES 8 and 8a to 8e illustrate a modified form of heat exchanger, designated generally 15′, which may be used in place of the heat exchanger 15 of the space-heating room unit shown in FIGURES 1 and 2, provided that the drive unit 21 is replaced by an electric motor. The heat exchanger 15′ is designed to enable the room unit to function as an air-conditioner in summer.

Figures 8, 8B, 8C, 8D, 8E:
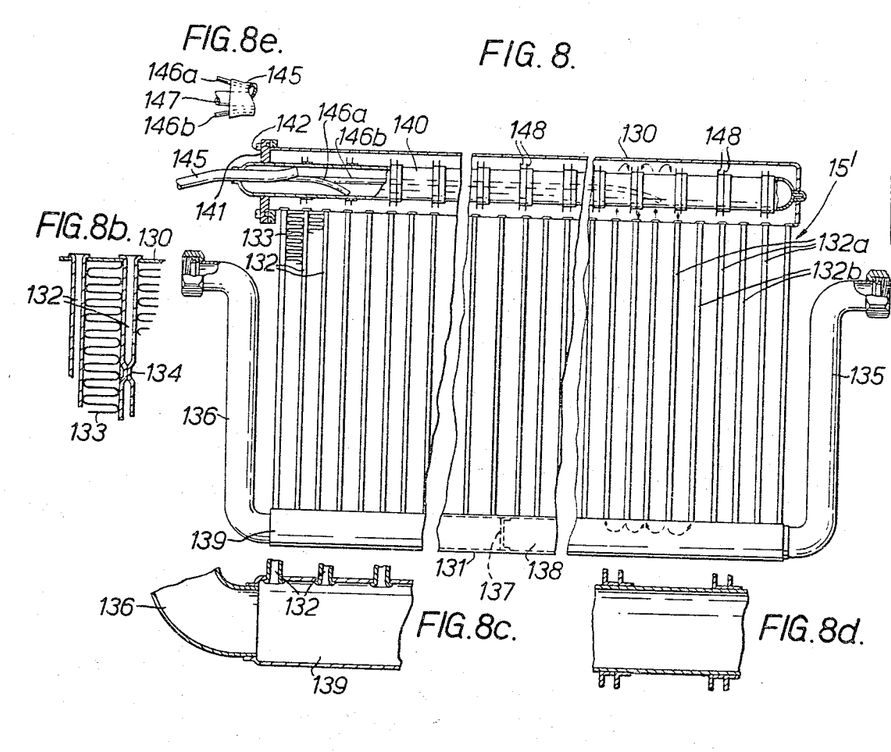
FIGURE 8 is a broken away part-elevational and part diagrammatic sectional view of a modified form of heat exchanger for use in the space-heating room unit of FIGURES 1 and 2.
FIGURE 8b is a scrap sectional view illustrating an upper part of the FIGURE 8 heat exchanger.
FIGURE 8c is a scrap sectional view showing a lower part of the FIGURE 8 heat exchanger.
FIGURE 8d is a scrap sectional view showing a portion of a refrigerator evaporator unit which is provided in association with the FIGURE 8 heat exchanger.
FIGURE 8e is a scrap elevational view of an end portion of the refrigerator evaporator unit.
Figure 8A:
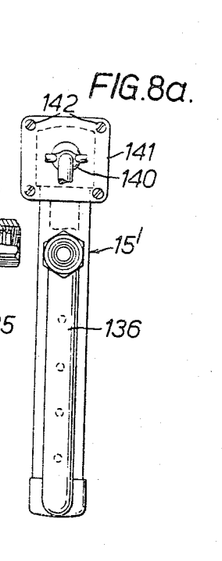
FIGURE 8a is an end elevation of the heat exchanger of FIGURE 8, seen in the direction of the arrow VIIIa thereon.

Instead of header members at its ends the modified heat exchanger 15′ has header members 130, 131 extending parallel to one another at top and bottom. As with the heat exchanger 15 previously described, the header members 130, 131 are interconnected by a series of flat tubes 132 extending parallel to one another, and deeply corrugated thin sheet-metal strips 133 are soldered between adjacent pairs of these tubes to extend their heat-exchanging area. As seen in FIGURES 8b and 8c, the tubes 132 are flanged out within the header members and have their opposed flat walls secured together at intervals, as seen at 134, to prevent bulging under pressure without blocking flow through the tubes. The lower header member 131 has its ends connected to inlet and outlet pipe connections 135, 136 and is divided by a central bulkhead 137 to form inlet and outlet chambers 138, 139. The upper header member 130 is undivided in its length, but is of large internal diameter and contains a refrigerator evaporator unit 140 of tubular formation. The evaporator unit 140 extends through and is sealed to a removable end plate 141 which forms a closure for one end of the header member 130 and is bolted to an end flange thereon as shown at 142: the inner end of the evaporator unit is located by a projection 143 thereon entering a recess 144 in the adjacent end wall of the header member. The evaporator unit 140 is connected to a compressor unit (not shown) by a pipe 145 containing two capillary tubes 146a, 146b and a return pipe 147; the capillary tubes serve for the conveyance of the refrigerant (i.e. Frigen) in liquid phase to the evaporator unit and the pipe 147 for the return flow of refrigerant, in vapour phase. The pipe 145 terminates within the evaporator unit 140 and the tubes 146a and 146b are led to points near either end so that heat absorption is more or less evenly distributed. The evaporator unit 140 carries pairs of rings 148 which extend the heat transfer area opposite alternate tubes 132; these alternate tubes are designated 132a and those between them 132b.

During the winter, the refrigerator evaporator unit 140 will be out of action and hot water will be circulated into the inlet connection 135 to the inlet chamber 138, up those of the tubes 132 leading out of this chamber to the upper header member 130, down to the outlet chamber through the tubes 132 communicating therewith, and out of the outlet connection 136. Heat is transferred to air passed through the thickness of the heat exchanger, as described above with reference to FIGURES 1 and 2. In summer, the water is not circulated from inlet pipe connection 135 to outlet pipe connection 136, (shut-off valves may be provided), and refrigerant is circulated in the refrigerator unit 140 which becomes cold. The cooling of the water in the upper header member 130 is more rapid adjacent the pairs of rings 148 than between them, so that water is circulated down the pipes 132a which are opposite the pairs of rings and up the pipes 132b which lie between them. Once again heat is transferred between the air which is caused by the fan unit to traverse the heat exchanger and the water circulating within it; this time, however, heat is removed from the air so that the room unit functions as an air-conditioner.

The refrigerator condenser unit may be situated close to the room unit, but is preferably placed somewhere outside the room so that its noise will not be heard by the occupants of the room. Several room units may be supplied from the same condenser unit.

Figure 9:
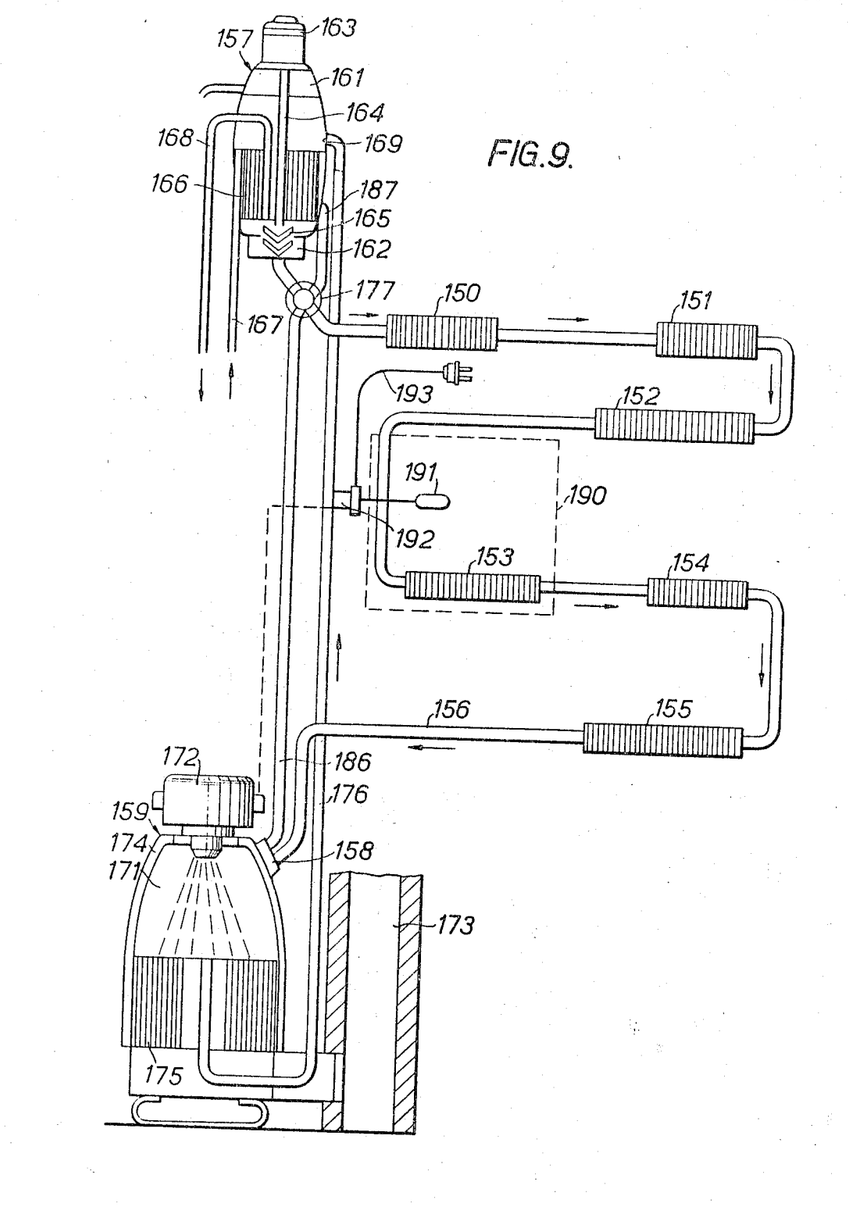
FIGURE 9 is a diagram of a central heating system incorporating space-heating room units as illustrated in previous figures.

FIGURE 9 shows a series of space-heating room units connected in a central heating system. In this figure, the room units, which may be as described with reference to FIGURES 1 to 7, or modified as described with reference to FIGURES 7a or 8 to 8e, are designated 150, 151, 152, 153, 154 and 155, and are series-connected in a pipe line 156 leading from a high-level or expansion tank 157 to a mixing device 158 associated with a boiler 159 located at a low point in the system. The high-level tank 157 has an overflow 160 defining a water level 161, and a circulation pump 162 for the system is provided at the bottom of the tank below the water level: the pump is driven by a motor 163 mounted on top of the tank, through a drive shaft 164 which depends vertically into the tank from the motor and supports the pump rotor 165 at its bottom end—this rotor is shown only diagrammatically in the figure, and may be of centrifugal or axial type. In the lower part of the high-level tank 157 there is a heat exchanger designated generally 166 which is fed with water from the city mains through an inlet pipe 167: the heat exchanger has an outlet 168 which is connected to the hot water taps of the building which is served by the system. Above the heat exchanger 166, but below the water level 161, there is an inlet 169 for water received from the boiler. The boiler 159 has a combustion chamber 171 supplied by a motor-driven oil burner device 172 and exhausting up a chimney 173. The upper part of the boiler 159 provides a water-jacket 174 communicating with a heat exchanger 175 within the combustion chamber. Water heated in the boiler 159 is led off from the heat exchanger by a pipe 176 connected to the main water inlet 169 of the high-level tank 157. Water leaving the pump 162 associated with that tank is led through a four-way valve 177 and thence through the pipe line 156 and the space-heating units 150, 151, 152, 153, 154 and 155 previously described back to the mixing device 158 at the top of the boiler 159. This device 158 leads a portion of the return flow into the water-jacket 174 of the boiler 159 and another portion via the pipe 186 and valve 177 to a secondary water inlet 187 of the high-level tank which terminates adjacent the pump chamber inlet 162a. The mixing valve 158 is set by manual and/or thermostatically controlled devices (not shown) to supply a proportion of the return water to the pump inlet and thereby reduce the temperature of the water circulated through the space-heating units 150, 151, 152, 153, 154 and 155 to a desired value. The four-way valve 177 can be set to allow a direct connection from the pump 162 through pipe 186 to the boiler when, as in summer, it is desired to by-pass the space-heating units 150, 151, 152, 153, 154 and 155. In this setting of the valve 177 the system operates simply to heat the tap water through the intermediary of the heat exchanger 166.

The oil burner 172 may be controlled thermostatically in dependence upon the temperature within a "sample" room, so that the burner is switched on when the temperature drops below a value which can be set at will. At the same time, the burner may be shut off when the temperature in the pipe 176 conveying water from the boiler 159 to the high-level, or expansion, tank 157, reaches a given maximum. In FIGURE 9, the room is indicated by the reference numeral 190, and contains a temperature sensitive device 191 connected to a control unit 192 associated with the pipe 176, and connected to a source of electrical energy shown schematically at 193. The control unit 192 will pass current to the motor of the burner 172 when the element 191 detects a temperature below the pre-set value, and the unit 192 detects a temperature in the water below the fixed maximum.

The high-level tank 157 and its various appurtences are further described in my copending United States application of even date herewith, being also a continuation-in-part of my earlier application Ser. No. 1,922, filed Jan. 12, 1960. The system described with reference to FIGURE 9 may be modified by the use of a conventional high-level or expansion tank, and a circulating pump situated near the boiler, in accordance with current central heating practice.

Figure 10:
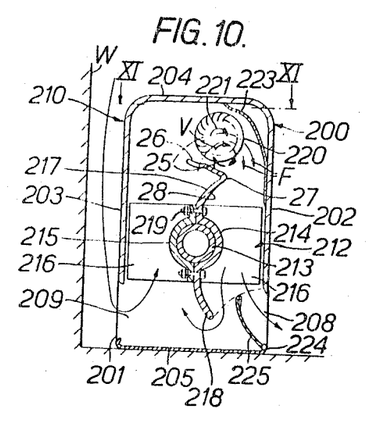
FIGURE 10 is a vertical transverse sectional view of a modified form of space-heating room unit.
Figure 11:
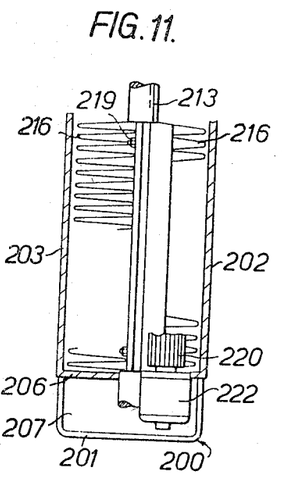
FIGURE 11 is a broken away horizontal sectional view, with certain parts removed, taken on the line XII—XII shown in FIGURE 10.

FIGURES 10 and 11 illustrate a simplified form of space-heating room unit designed to be installed close to but spaced from the wall W of a room. This unit comprises a rectangular casing 200 having end walls 201, front and rear walls 202, 203 and a top 204 and a bottom 205. A bulkhead 206 extending vertically from front to rear defines a motor compartment 207 adjacent one end wall 201. Between the bulkhead 206 and the other end wall 201 the bottom portions of front and rear walls 202, 203 are cut away to form slot-like outlet and inlet openings 208, 209. Above the outlet and inlet openings 208, 209 the front and rear walls 202, 203, the bulkhead 206 and said other end wall 201, and said top 204 provide a closed upper casing part 210 which is provided with interior lagging. A heat exchanger 212 is disposed in the lower portion of this upper casing part 210; the heat exchanger comprises a single straight pipe 213 extending horizontally from end to end of the casing 200 halfway between front and rear walls 202, 203 thereof, and a pair of castings 214, 215 which mate about the pipe on the vertical central plane and which provide a series of fins 216 extending to the front and rear walls and transverse walls 217, 218 projecting respectively above and below the pipe and extending the whole width of the upper casing part. The castings 214, 215 are bolted together as shown at 219; between the pipe 213 and the adjacent surfaces of the casting there is interposed a readily melted metal alloy such as bismuth-lead eutectic or wood metal whereby on first using the room unit the hot water circulating in the pipe melts the metal which runs between the mating surfaces to ensure good heat conduction between them.

Above the heat exchanger 212 is a cylindrical bladed rotor 220 extending horizontally from end to end of the upper casing part 210; this rotor is similar in design to the rotor 18 of the room unit of FIGURES 1 and 2, and is rotated in the direction of the arrow 221 by means of an electric motor 222 in the motor compartment 207 which has its shaft drivingly connected to the rotor in the general manner illustrated in FIGURE 4. The wall 217 corresponds to the guide wall 23 illustrated in FIGURE 2 and its various guide surfaces are designated similarly to those of the wall 23. A sheet metal guide wall 223 extending from above the rotor 220 and fairing into the lagging inside the front wall 202 corresponds to the guide wall 24 of FIGURE 2. The rotor 220 co-operates with the walls 217 and 223 in the manner described with reference to FIGURE 2; the flow is once again indicated schematically by the lines V, F.

The transverse wall 218 projecting below the pipe 213 is gently curved towards the front and terminates short of the bottom 205 of the casing 200. To the front edge 224 of the bottom 205 there is pivoted a control flap 225 capable of movement between a position where it abuts the transverse wall 218 and a position where it abuts the upper edge of the outlet opening 208.

In operation of the space-heating room unit just described, hot water is circulated continuously through the pipe 213; rotation of the rotor 220 by the motor 222 induces a flow through the inlet opening 209, up over the fins 216 of the heat exchanger 212 between the pipe 213 and the rear wall 203, twice through the path of the rotating blades of the rotor 220, and down over the fins of the heat exchanger between the pipe 213 and the front wall 202. If the control flap 225 is set intermediate its extreme positions, e.g. as shown in FIGURE 10, then a proportion of the air leaving the heat exchanger 212 passes around the lower end of the transverse wall 218 and recirculates through the heat exchanger and fan rotor, while a proportion of the air passes direct to the outlet 208. Guided by the upper surface of the control flap 225, the outflowing air is directed forwardly over the floor of the room in a flat jet.

The amount of air recirculated is controlled by the position of the control flap 225 and it will be appreciated that the more air recirculated, the lower the throughput but the higher its temperature. This recirculation of air is particularly valuable when it is desired to achieve a high temperature in the outflowing air. In general the form of fan herein disclosed is not adapted to produce a high static pressure but is capable of moving large volumes of air. Any attempt to achieve a high air temperature by interposing in the path of air flow a heat exchanger having a high resistance might throttle the fan to a point where its throughput and efficiency were impaired to the extent of being uneconomic. By recirculating the air its temperature is raised without making the heat exchanger resistance excessive and the fan operates under optimum conditions of large throughput and low pressure.

With the fan motor 222 stopped, negligible heat escapes from the unit. The motor may have a control switch providing two or more motor speeds so that the amount of heat can be varied.

Features of construction and operation of the room unit of FIGURES 10 and 11 which are similar to those previously described with reference to earlier figures will be sufficiently apparent from that earlier description and will not need to be stressed again here.

An even simpler form of space heating room unit resembles that of FIGURES 10 and 11, but has the control flap fixed in position, or alternatively the transverse wall brought down to the front edge of the casing bottom.

Figure 12:
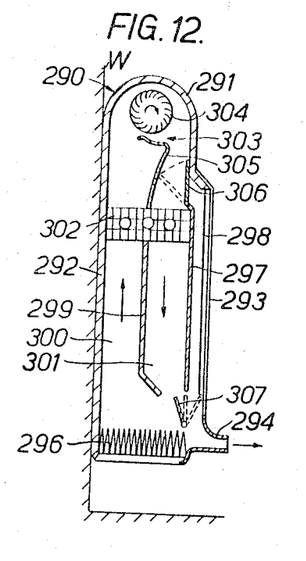
FIGURE 12 is a vertical transverse sectional view of a further form of space-heating room unit.

FIGURE 12 shows a combined radiant and forced air space heater. A generally rectangular casing here designated 290 has a rounded top portion 291, a rear wall 292 which is set against the wall W of a room, a set-forward radiating front wall 293 and, below this at the bottom of the heater, an outlet slot 294. The inside of the rear wall 292 and the top casing portion 291 down to upper edge of the radiating wall 293 is heat-insulated. The casing 290 has also insulated end walls which are not shown in the figure. A pleated filter 296 occupies the bottom of the casing 290, and ambient air has access to the lower side thereof. Within the casing 290 an insulated vertical partition wall 297 extends behind the radiating wall 293 and defines therewith a passage 298. A second insulated vertical partition wall 299 running longitudinally of the casing 290 divides the central part thereof into two channels 300, 301 of equal cross-section. A heat exchanger 302 extends horizontally over the whole internal area of the casing 290 between the rear wall 292 and the partition wall 297, and is abutted by the top edge of the second partition wall 299. A blower designated generally 303 is located in the upper part of the casing 290 and comprises a rotor 304 and a guide wall 305, both extending over the length of the casing; the blower is constructed and operates in the manner described with reference to FIGURES 1 and 2. The guide wall 305 as will be seen is similar in general formation to the guide wall 24 of FIGURES 1 and 2: it extends down to the heat exchanger 302 opposite the partition wall 299. A flap 306 is pivoted to the upper edge of the partition wall 297 and adjustable between a position in which it closes off the upper end of the passage 298 and a position in which the whole blower throughput is diverted therethrough. A flap 307 is pivoted within the casing 290 adjacent and in spaced parallel relation to the lower edge of the radiating wall 293, and is adjustable to bring its free edge close to the bottom edge of either partition wall 297, 299, or against the inner surface of the radiating wall 293.

In operation the blower 303 draws in air through the filter 296 (unless the flaps are set for 100% recirculation as will be described) up channel 300, and through the left hand side of the heat exchanger 302. The positions of the flaps 306, 307 determine the quantity of air discharged through the outlet 294, the quantity recirculated through the heat exchanger 302, and the quantity flowing through the passage 298 and transferring heat to the wall 293 for radiation therefrom. Thus the flap 306 may be positioned to close the passage 298 and the flap 297 used as a splitter to recirculate the proportion of throughput required to achieve a given temperature in air discharged through the outlet 294. The flap 307 may alternatively be positioned to close the outlet 294, and the flap 306 positioned for flow through the passage 298, so that the heater functions solely as a radiator. Intermediate positions of the flaps 306, 307 will permit varying combinations of radiation and forced air heating.

Once again features and advantages already discussed in connection with other embodiments of the invention will not need to be referred to here.

I claim:
1. A space heater comprising a casing having therein a passageway extending between an air inlet and an air outlet; fluid passage means extending through the casing and connecting with a fluid inlet and a fluid outlet and providing a heat exchanger therein for transfer of heat between a fluid transversing the fluid passage means and air passing thereabout, said fluid passage means being adapted for series connection in a hot fluid circulating pipe of a central heating system; rotary blower means mounted in the casing and positioned in the passageway to convey air into the air inlet, about said fluid passage means and out of the air outlet; drive means connected to the blower for driving the same, said drive means comprising a turbine mounted in said fluid passage means for rotation by the passage of said fluid therein; and means for controlling the operation of said blower means without substantially throttling said fluid passage means.

2. A central heating system comprising a central heat exchanger means to transfer heat from a circulating fluid, piping for said circulating fluid extending between a fluid input and fluid output of the central heat exchanger, circulating means to induce a fluid circulation in said piping, and a plurality of individual warmed-air space heaters, each heater comprising a casing having therein a passageway extending between an air inlet and an air outlet, a duct for said circulating fluid extending through the casing and providing a heat exchanger therein for transfer of heat between said fluid and air passing over the duct, said duct being series connected in said piping, rotary blower means mounted in the casing and positioned in the passageway to convey air into the air inlet, about said duct, and out of the air outlet, a turbine in the duct connected to the blower for driving the same, and means for controlling the operation of the blower without substantially throttling fluid flow in said duct.

3. A space heating room unit comprising a casing having a closed upper part and a lower part providing an air inlet and air outlet; an inverted U-shaped passageway in said closed part and positioned in the direction of air flow between said air inlet and air outlet to provide paths of air flow of inverted U-shape within the closed part; heat exchanger having fluid flow conduit means therein connected to a fluid inlet and a fluid outlet for transfer of heat between a fluid circulating in the heat exchanger and air flowing over it, said heat exchanger being positioned in said U-shaped passageway; and a cross flow blower mounted within the casing and positioned in said U-shaped passageway; said blower on operation conveying air into said inlet, through said U-shaped passageway, over the heat exchanger and out of the outlet and when said blower is not operating, said closed upper part preventing flow of heat from the heat exchanger to the exterior of the casing, wherein said blower is provided with a drive unit in the form of a turbine series-connected with the fluid flow conduit in the heat exchanger and wherein said turbine comprises a casing defining a chamber and a turbine rotor mounted therein for rotation about an axis and having means including a coaxial cylindrical wall which define a fluid flow passage and a blade ring in said passage, the casing providing inlet and outlet openings to said chamber one of which openings is aligned on said rotor axis and opposite an end of said cylindrical wall and in spaced relation thereto, and movable duct means in the chamber movable between a position in which it is aligned with the cylindrical wall between the end thereof and the opposite opening to direct fluid between said flow passage and said opening and a position in which it is out of alignment with said cylindrical wall and provides for flow of fluid between said openings and by-passing said fluid flow passage in the turbine rotor.

4. A space heating room unit comprising a casing having a closed upper part and a lower part providing an air inlet and air outlet; an inverted U-shaped passageway in said closed part and positioned in the direction of air flow between said air inlet and air outlet to provide paths of air flow of inverted U-shape within the closed part; a heat exchanger having fluid flow conduit means therein connected to a fluid inlet and a fluid outlet for transfer of heat between a fluid circulating in the heat exchanger and air flowing over it, said heat exchanger being positioned in said U-shaped passageway; and a cross flow blower mounted within the casing and positioned in said U-shaped passageway; said blower on operation conveying air into said inlet, through said U-shaped passageway, over the heat exchanger and out of the outlet and when said blower is not operating, said closed upper part preventing flow of heat from the heat exchanger to the exterior of the casing, wherein the blower comprises a bladed cylindrical rotor extending opposite the heat exchanger and guide means cooperating with the rotor on rotation thereof to induce a flow of air twice through the path of the rotating blades of the rotor and wherein the rotor is located near the top of the closed upper casing part and at the bight of said U-shaped paths and turns flow in such paths through an angle exceeding 90°.

5. A room unit as claimed in claim 4 wherein the heat exchanger has the form of a rectangle and is inclined downwardly and inwardly from one upper side of the upper casing part and the rotor is mounted adjacent the other upper side of said casing part.

6. A room unit as claimed in claim 4, wherein the heat exchanger has the form of a single finned pipe running through the casing and having fins extending into both the upward and the downward flow in the casing.

7. A space heating room unit comprising a casing having a closed upper part and a lower part providing an air inlet and air outlet; an inverted U-shaped passageway in said closed part and positioned in the direction of air flow between said air inlet and air outlet to provide paths of air flow of inverted U-shape within the closed part; a heat exchanger having fluid flow conduit means therein connected to a fluid inlet and a fluid outlet for transfer of heat between a fluid circulating in the heat exchanger and air flowing over it, said heat exchanger being positioned in said U-shaped passageway; and a cross flow blower mounted within the casing and positioned in said U-shaped passageway; said blower on operation conveying air into said inlet, through said U-shaped passageway, over the heat exchanger and out of the outlet and when said blower is not operating, said closed upper part preventing flow of heat from the heat exchanger to the exterior of the casing, wherein the heat exchanger comprises upper and lower header members interconnected by a series of tubes and the upper header member contains a refrigerator evaporator unit arranged to extract heat at different rates from different regions of the upper header member and thereby introduce a thermal circulation through the tubes of the heat exchanger with the heat exchanger then extracting heat from air passing through it.

8. A central heating system comprising a central heat exchanger means to transfer heat from a circulating fluid, piping for said circulating fluid extending between a fluid input and fluid output of the central heat exchanger, circulating means to induce a fluid circulation in said piping, and a plurality of individual warmed-air space heaters, each heater comprising a casing having therein a passageway extending between an air inlet and an air outlet, a duct for said circulating fluid extending through the the casing and providing a heat exchanger therein for transfer of heat between said fluid and air passing over the duct, said duct being series connected in said piping, rotary blower means mounted in the casing and positioned in the passageway to convey air into the air inlet, about said duct, and out of the air outlet, a turbine in the duct connected to the blower for driving the same, and means for controlling the operation of the blower without substantially throttling fluid flow in said duct, wherein each of said space heaters includes a casing having a closed upper part and a lower part providing an air inlet and an air outlet, an inverted U-shaped passageway within the casing extending between said air inlet and said air outlet, the heat exchanger being interposed in the passageway in the closed upper part of the casing, the closed upper portion substantially preventing flow of heat from the heat exchanger to the exterior of the casing except on operation of the blower.

9. A system as claimed in claim 8, wherein the blower control means comprises means to by-pass circulating fluid around the turbine.

References Cited
UNITED STATES PATENTS

| | | | |
|---|---|---|---|
| 1,332,923 | 3/1920 | Shurtleff | 261—157 |
| 1,833,885 | 11/1931 | Pinkerton et al. | 62—394 |
| 1,841,068 | 1/1932 | Starling | 165—108 X |
| 2,022,333 | 11/1935 | Woolley | 165—54 |
| 2,434,847 | 1/1948 | Hagen | 230—125 X |
| 2,471,692 | 5/1949 | Jones | 98—94 X |
| 2,532,328 | 11/1950 | Penning | 62—394 |
| 2,692,759 | 10/1954 | Swenson et al. | 165—40 |
| 2,787,946 | 4/1957 | Gannon | 165—54 X |
| 2,904,317 | 9/1959 | Copeland et al. | 165—124 X |
| 3,032,323 | 5/1962 | Church | 165—39 |
| 3,035,760 | 5/1962 | Simmons | 230—125 |

ROBERT A. O'LEARY, *Primary Examiner.*

CHARLES SUKALO, *Examiner.*

T. W. STREULE, JR., *Assistant Examiner.*